United States Patent
Ruotsalainen et al.

(10) Patent No.: US 10,002,443 B2
(45) Date of Patent: Jun. 19, 2018

(54) DYNAMIC RENDERING OF GRAPHICS

(71) Applicant: Rightware Oy, Helsinki (FI)

(72) Inventors: Arto Ruotsalainen, Helsinki (FI); Jussi Lehtinen, Helsinki (FI)

(73) Assignee: Rightware Oy, Helsinki (FI)

( * ) Notice: Subject to any disclaimer, the term of this patent is extended or adjusted under 35 U.S.C. 154(b) by 238 days.

(21) Appl. No.: 14/877,947

(22) Filed: Oct. 8, 2015

(65) Prior Publication Data

US 2016/0110887 A1 Apr. 21, 2016

(30) Foreign Application Priority Data

Oct. 17, 2014 (FI) ...................................... 20145912

(51) Int. Cl.
| | |
|---|---|
| *G06T 11/00* | (2006.01) |
| *G09G 5/14* | (2006.01) |
| *G09G 5/36* | (2006.01) |
| *G09G 5/00* | (2006.01) |

(52) U.S. Cl.
CPC ............... *G06T 11/00* (2013.01); *G09G 5/14* (2013.01); *G09G 5/363* (2013.01); *G06T 2200/16* (2013.01); *G09G 5/001* (2013.01); *G09G 2340/0435* (2013.01); *G09G 2360/08* (2013.01); *G09G 2380/10* (2013.01); *G09G 2380/12* (2013.01)

(58) Field of Classification Search
None
See application file for complete search history.

(56) References Cited

U.S. PATENT DOCUMENTS

| | | | |
|---|---|---|---|
| 2008/0309474 A1* | 12/2008 | Okamoto | B60K 35/00 340/462 |
| 2012/0038654 A1 | 2/2012 | Wang et al. | |
| 2012/0144397 A1* | 6/2012 | Imai | G09G 5/14 718/103 |
| 2013/0304308 A1 | 11/2013 | Maruyama et al. | |
| 2014/0002739 A1* | 1/2014 | Kwa | H04N 5/46 348/536 |
| 2014/0085196 A1* | 3/2014 | Zucker | G06F 9/4443 345/156 |
| 2014/0247255 A1 | 9/2014 | Von Beuningen et al. | |
| 2015/0146097 A1* | 5/2015 | Izumi | H04N 7/0127 348/447 |
| 2016/0071482 A1* | 3/2016 | Backstrom | B60K 35/00 701/29.1 |

FOREIGN PATENT DOCUMENTS

| | | |
|---|---|---|
| EP | 1800959 A1 | 6/2007 |
| EP | 2079015 A1 | 7/2009 |
| JP | 2008189211 A | 8/2008 |
| WO | WO2014168566 A1 | 10/2014 |

* cited by examiner

*Primary Examiner* — James A Thompson
(74) *Attorney, Agent, or Firm* — Sepp Laine Oy (57) ABSTRACT

In accordance with an example aspect of the present invention, there is provided an apparatus comprising at least one processing core configured to render a dynamic graphical output, the graphical output comprising at least a first subsection and a second subsection, rank the first subsection relative to the second subsection based on at least one criterion, determine a scarcity of computational resources, and responsively, based on the ranking, reduce an update frequency of the second subsection, and a transmitter configured to provide information defining the graphical output toward a display.

20 Claims, 6 Drawing Sheets

DYNAMIC RENDERING OF GRAPHICS

FIELD OF INVENTION

The present invention relates to dynamically controlling rendering of graphics.

BACKGROUND OF INVENTION

Computer graphics may be generated using general-purpose processors and/or specialized graphics processors. In a general-purpose example, a general-purpose computer may be operably connected to a display, such as for example a flat-screen monitor, and arranged to execute a program based on which the processor of the general-purpose computer may render a graphical output. The rendered graphical output may be provided from the processor to the display, the display being arranged to act on the graphical output to produce an image that may be sensed visually by humans.

In an example that uses a specialized graphics processor, a main processor may direct the graphics processor to perform certain mathematical tasks needed in rendering the graphical output. The graphics processor may thus function under the direction of the general-purpose main processor. The graphics processor may be designed to be effective in performing the type of mathematical tasks typical in graphics rendering, in effect saving computational resources in the main processor which can execute other tasks while the graphics processor, at least in part, performs the rendering.

A computer, such as for example a laptop computer or desktop computer, may be arranged to function using a single main processor, or alternatively using a combination of a main processor and a graphics processor. A user may decide whether a computer with a separate graphics processor is necessary, for example in spread sheet use graphics performance is not central, whereas computer-aided design, CAD, may benefit from good graphics performance provided by a separate graphics processor.

Embedded devices may be engineered to provide a graphics performance level considered suitable for the task, for example a compact disk, CD, player may display which track is playing, which requires only very modest graphics performance, while a gaming console requires far more extensive graphics performance. Dimensioning graphics performance for embedded devices therefore may require use of judgement.

Examples of embedded devices include mobile devices, such as personal health monitors, smartphones, smart watches and laptops, as well as embedded graphical systems in cars. In addition to, or alternatively to, general purpose processors and graphics processors, embedded devices may comprise proprietary processors.

SUMMARY OF THE INVENTION

The invention is defined by the features of claim 1. Some specific embodiments are defined in the dependent claims.

In accordance with a first aspect of the present invention, there is provided an apparatus comprising at least one processing core configured to render a dynamic graphical output, the graphical output comprising at least a first subsection and a second subsection, rank the first subsection relative to the second subsection based on at least one criterion, determine a scarcity of computational resources, and responsively, based on the ranking, reduce an update frequency of the second subsection, and a transmitter configured to provide information defining the graphical output toward a display.

Various embodiments of the first aspect may comprise at least one feature from the following bulleted list:
- the criterion is relevance to safety
- the graphical output comprises information concerning a current state of at least one of: an automobile system, an aircraft system, an industrial machine and a power generation plant
- the graphical output comprises information concerning at least one of: a communication session, a media playback session, a broadcast session, a user session, map information, a battery level, a velocity indication, an altitude indication and an industrial process indication
- the criterion is at least one of a characteristic timescale and a priority
- the first subsection has a shorter characteristic timescale than the second subsection
- the first subsection comprises a digital instrument display and the second subsection indicates at least one of: remaining fuel, remaining distance to maintenance and oil pressure
- the digital instrument display indicates at least one of: velocity of a car, velocity of an aircraft and engine revolutions per time unit
- the determining of the scarcity of computational resources is based on at least one of a thermal limit, an overload condition, a determined lag and a quantity of interrupts
- causing the first subsection to be rendered at a higher update frequency than the second subsection comprises keeping an update frequency of the first subsection constant and lowering an update frequency of the second subsection
- the apparatus is configured to set an update frequency of the first subsection to a predefined minimum update frequency, and subsequently select the reduced update frequency for the second subsection based on computational resources then remaining
- the at least one processing core is further configured to adjust, in real time, the ranking of the first subsection relative to the second subsection based at least in part on an operating condition
- responsive to the scarcity, the apparatus is configured to begin rendering at least one of the first subsections and the second subsection in at least one of a smaller size, a reduced detail level and a reduced quality level than before the scarcity In accordance with a second aspect of the present invention, there is provided a method comprising rendering a dynamic graphical output, the graphical output comprising at least a first subsection and a second subsection, ranking the first subsection relative to the second subsection based on at least one criterion, determining a scarcity of computational resources, and responsively, based on the ranking, reducing an update frequency of the second subsection, and providing information defining the graphical output.

Various embodiments of the second aspect may comprise at least one feature corresponding to a feature from the preceding bulleted list laid out in connection with the first aspect.

In accordance with a third aspect of the present invention, there is provided an apparatus comprising means for rendering a dynamic graphical output, the graphical output comprising at least a first subsection and a second subsection, means for ranking the first subsection relative to the second subsection based on at least one criterion, means for determining a scarcity of computational resources, and responsively, based on the ranking, reducing an update frequency of the second subsection, and means for providing information defining the graphical output.

In accordance with a fourth aspect of the present invention, there is provided a non-transitory computer readable medium having stored thereon a set of computer readable instructions that, when executed by at least one processor, cause an apparatus to at least render a dynamic graphical output, the graphical output comprising at least a first subsection and a second subsection, rank the first subsection relative to the second subsection based on at least one criterion, determine a scarcity of computational resources, and responsively, based on the ranking, reduce an update frequency of the second subsection, and provide information defining the graphical output.

In accordance with a fifth aspect of the present invention, there is provided a computer program configured to cause a method in accordance with the second aspect, or embodiments thereof, to be performed.

INDUSTRIAL APPLICABILITY

At least some embodiments of the present invention find industrial application in increasing efficiency and/or safety of vehicles and/or industrial processes.

DETAILED DESCRIPTION OF EXAMPLE EMBODIMENTS

The amount of available computational resources may vary depending on various factors, which may include thermal conditions, a radiation environment and processor load. In case computational resources become scarce, prioritizing use of the computational resources can be performed to maintain at least tasks that are relevant to safety, for example a frame rate of a rendered graphical indicator may be maintained, while other processes may be slowed down to conserve computational resources.

Figure 1:
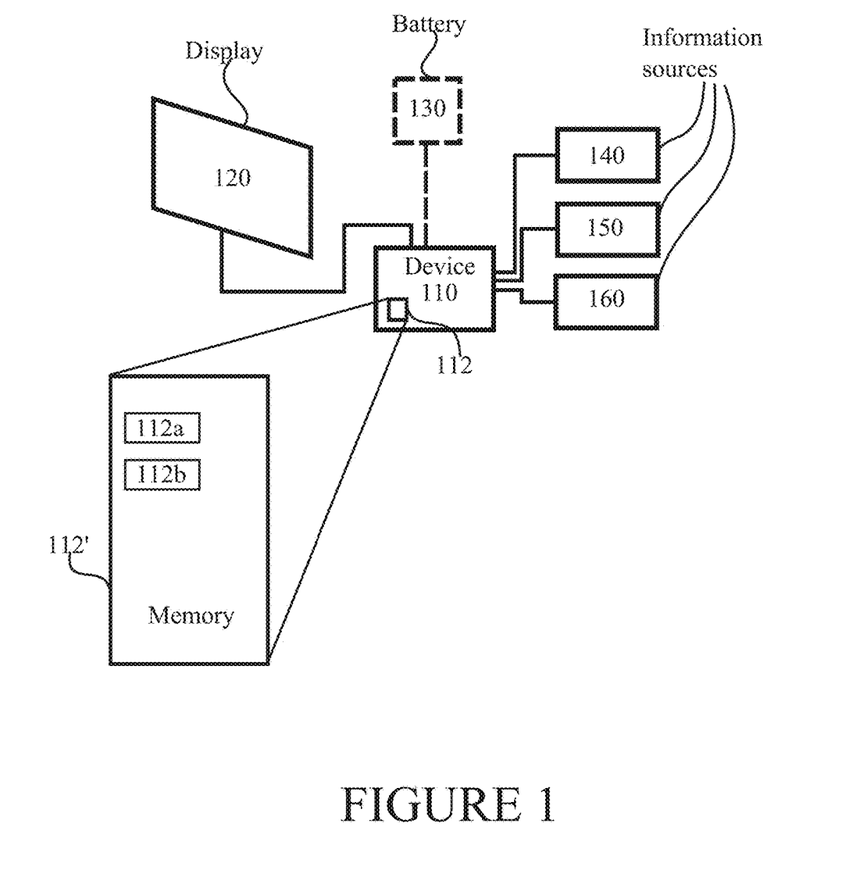
FIG. 1 illustrates an example system capable of supporting at least some embodiments of the present invention.

FIG. 1 illustrates an example system capable of supporting at least some embodiments of the present invention. The system of FIG. 1 comprises a display 120, which may comprise, for example, a light emitting diode, LED, or organic LED, OLED, display. Alternatively, display 120 may comprise a cathode ray tube, CRT, or other kind of display. Display 120 is communicatively coupled to device 110, which may comprise, for example, a control device or display controller. Device 110 may in some embodiments be integrated with display 120 in one physical apparatus.

Device 110 may be configured to control display 120 by providing to display 120 a video signal to direct the functioning of display 120. The video signal may be in a suitable format that device 110 is arranged to produce, and display 120 is arranged to act on. For example, device 110 may direct display 120 to display status information. The connection between device 110 and display 120 may comprise a red-green-blue, RGB, or high-definition multimedia interface, HDMI, interface, for example.

Device 110 is in the example of FIG. 1 configured to receive information from information sources 140, 150 and 160 via at least one connection arranged between device 110 and the information sources. A first example of a suitable information source is an engine that is configured to inform device 110 concerning a speed at which the engine is running A running speed may be expressed as revolutions per minute, for example, or as a percentage of a maximum run rate. A second example of a suitable information source is a fuel tank sensor configured to inform device 110 concerning an amount of fuel remaining in a fuel tank. The amount may be expressed as a percentage of maximum, for example. A third example of a suitable information source is a sensor configured to inform device 110 of an altitude at which an aircraft housing the system of FIG. 1 is flying. A fourth example of a suitable information source is a sensor configured to inform device 110 of a remaining charge in a battery, such as battery 130. The remaining charge may be expressed as a percentage of a maximum charge, for example. A fifth example of a suitable information source is a music player program or device, configured to provide device 110 with an image associated with a music track being played. A sixth example of a suitable information source is a nuclear reactor coolant pressure sensor, configured to provide device 110 with a value of a current pressure prevailing in a coolant circuit of a nuclear reactor.

A seventh example of a suitable information source is a satellite positioning receiver configured to provide device 110 with information relating to a current location of the system illustrated in FIG. 1. Device 110 may responsively provide to display 120 a video signal comprising a map with the current location indicated.

Optional battery 130 may be configured to power at least one of device 110, display 120, information source 140, information source 150 and information source 160. When present, the battery may comprise a lithium-ion or lead battery, for example. In embodiments without battery 130, the system may be powered from a power source not present in FIG. 1, such as for example a different battery, a stable power source or an engine.

Device 110 may comprise at least one processor, such as for example a general-purpose processor or graphics processor. The processor may comprise, or be comprised as, at least one processing core. A graphics processor may comprise, or be comprised as a graphics processing core. The at least one processor may be of a proprietary type.

Device 110, or at least one processor comprised therein, may be configured to render a graphical output for display 120. Rendering a graphical output may comprise, for example, calculating, based at least in part on input received from at least one information source, a visual representation for displaying via display 120. The graphical output may be determined based at least in part on a program stored in a memory 112 that is accessible to device 110, for example by being comprised in device 110. The graphical output may be communicated to display 120 encoded in a video signal between device 110 and display 120, for example. The graphical output may comprise a video signal for controlling a single physical display 120.

Device 110 may be configured to render the graphical output for display 120 so that it comprises subsections, for example at least two subsections. In some embodiments the graphical output consists entirely of subsections, while in other embodiments the graphical output comprises content that is not comprised in any subsection.

Contents of memory 112 are schematically illustrated as 112' in FIG. 1. Comprised therein is subsection definition 112a, and subsection definition 112b. Subsection definition 112a may contain information defining a first subsection, for example subsection definition 112a may describe a visual outlook of the first subsection, so that device 110 may derive the graphical form of the first subsection using an information source associated with the first subsection and subsection definition 112a. For example, subsection definition 112a may comprise a visual form of a speedometer, so that device 110 can use it and a speed indication from information source 140, comprising a sensor, to render a graphical image of a speedometer with a needle indicating the current speed.

Likewise, subsection definition 112b may contain information defining a second subsection, for example subsection definition 112b may describe a visual outlook of the second subsection, so that device 110 may derive the graphical form of the second subsection using an information source associated with the second subsection and subsection definition 112b. For example, subsection definition 112b may comprise a visual form of a fuel gauge, so that device 110 can use it and a remaining fuel indication from a fuel sensor to render a graphical image of a fuel gauge indicating the current amount of remaining fuel.

In general, a subsection definition may comprise at least one of: a description of a visual outlook of the subsection, a target frame rate, a minimum frame rate, a priority, a characteristic timescale and an indication whether the subsection is relevant to safety.

Once rendering is done, the rendered graphical output may be completed and provided to display 120. In rendering, part of the content of the graphical output may be calculated and part retrieved from a memory, or alternatively the entire content may be calculated. The number of subsections may be different from two, for example there may be three, or seven, subsections. In some embodiments, each subsection is associated with an information source. The rendering may be a continuous process in that device 110 may provide video feed to display 120, that is, device 110 may continually render the graphical output based at least in part on input from information sources, modifying the graphical output in real time responsive to changes in information received from the information sources. By continually rendering it may be meant that device 110 provides a new version of the graphical output to display 120 at the refresh frequency of display 120.

Computational resources in device 110 available for rendering may change. Device 110 may have a baseline amount of computational resources, which may be defined, for example, by the number and type of processors or processing cores of device 110, and the clock frequency or frequencies at which they are run. The amount of resources available for rendering the graphical output may change during use. Possible reasons for a change in the amount of resources available for rendering include an increase in an amount of computational resources consumed in other processes running in device 110, and a heat condition of device 110. A heat condition may cause that at least one clock frequency of at least one processor or processing core of device 110 is lowered, to prevent physical damage from occurring to the processor or processing core. For example, in case device 110 is comprised in an engine compartment, the engine compartment may heat up from waste heat generated by an engine. Computing using processors also produces waste heat in itself. A temperature sensor may be configured to provide a signal to trigger lowering a clock frequency, for example a master clock frequency. Such a temperature sensor may be comprised in device 110, for example.

A condition where available computational resources are insufficient to render the entire graphical output at a normal rate may be referred to as a scarcity of computational resources. A normal rate, in this regard, may be a default frame rate of the graphical output. In case subsections comprised in the graphical output have different default frame rates defined in respective subsection definitions, a normal rate may be considered a state where each subsection is rendered at its respective default frame rate. A scarcity of computational resources may also be defined as a condition where available computational resources are insufficient to render the graphical output at the current frame rate, or where subsections are being rendered at different frame rates, at the current frame rates.

Responsive to determining a scarcity of computational resources, device 110 may be configured to modify at least one frame rate of at least one subsection comprised in the graphical output. For example, device 110 may consult subsection definitions stored in memory 112 to find out which subsections are not relevant to safety, and to lower the frame rates for these non-safety related subsections. For example, in a car, a speedometer may be described as related to safety, while a visual representation of a media player, such as a mp3 player, would not be relevant to safety. Thus in case of scarcity of computational resources, device 110 may lower a frame rate of a subsection associated with the media player while keeping the frame rate of the subsection displaying the speedometer unchanged. Device 110 may, optionally, provide in the graphical output provided to display 120 an indication of the scarcity to allow a user to understand why the frame rate of at least one of the subsections is lowered.

In some embodiments, device 110 is configured to lower a frame rate of at least one subsection related to safety to a lower bound defined in the subsection definition of this subsection. For example, a safety-related subsection may have defined in its subsection definition that its default frame rate is 60 frames per second, but that 50 frames per second is still acceptable. Device 110 may in case of computational resource scarcity lower the frame rate of this subsection to 50 frames per second. In general, responsive to computational resource scarcity device 110 may be configured to lower the frame rates of subsections related to safety to the lower bounds defined in the respective subsection definitions. The frame rates of other, non-safety related, subsections may be lowered to whatever rate can still be supported with computational resources left over from rendering the safety related subsections.

In case the computational resource scarcity is so limiting that, even if subsections not related to safety have their frame rates set to zero, still the subsections related to safety cannot be rendered at their respective lower bounds, device 110 may be configured to re-scale the subsections related to safety so they appear smaller on display 120, as reduced size versions of the subsections may require less computational resources to render. Alternatively or additionally to reducing size, a reduced detail level and a reduced quality level may be adopted responsive to the determination of scarcity of computational resources. A reduced detail level may comprise presenting a more rudimentary indication, such as for example omitting ornamental aspects from the rendering. A reduced quality level may comprise rendering the subsection as if it had a lower resolution.

In general, subsections may be ranked according to a criterion which need not be relevance to safety, for example a characteristic timescale can alternatively, or additionally, be used to rank the subsections for frame rate adjustment. Subsections that relate to phenomena with longer characteristic timescales may perform adequately at lower frame rates, for example a subsection that relates to displaying maintenance cycles of equipment may have a substantially longer characteristic timescale than a subsection that relates to fluctuations in a steam pressure in a power generating plant. Accordingly, device 110 may be configured to lower frame rates of subsections with longer characteristic timescales, and keep frame rates of subsections with shorter characteristic timescales unchanged in case of scarcity of computational resources.

In general, lowering an updating frequency of a subsection may comprise providing to display 120 an indication that display 120 is to re-use a previous frame as a current frame. Updating may comprise rendering, wherein rendering may comprise computational operations that consume significant computational resources. Re-using, at least in part, a previous frame conserves computational resources by omitting, at least in part, these computational operations. Re-using a previous frame as a current frame may comprise re-using the previous frame in part. Rendering may be performed over more than one frame of the frame rate, wherein parts of a subsection may be re-used from a previous frame and the rest may have been rendered anew. For example, where an updating frequency of display 120 is 60 Hz and a frame rate of a subsection is reduced from 60 Hz to 15 Hz, display 120 may be instructed to display a subsection frame received from device 110 four times on consecutive refreshes. Alternatively, lowering an updating frequency of a subsection may comprise buffering a subsection frame in a memory accessible to device 110, and subsequently providing the subsection frame from the buffer as a current subsection frame instead of rendering a new frame. Frames of subsections whose updating frequency is not lowered would still be rendered each time. For example, when reducing a frame rate from 60 Hz to 15 Hz, device 110 could in this case initially render a subsection frame and provide it to display 120 as a current frame, and store the subsection frame in the memory. The subsection frame can then be provided from the memory three times as a current frame. Frames of subsections running at 60 Hz would still be rendered anew each time.

Each subsection may be rendered based on at least one scene graph, such that the at least one scene graph does not affect the rendering of any other subsection. A scene graph may comprise, for example, data structure having a tree structure. This facilitates, or even enables, setting an update frequency of the subsection independently of other subsections, since a scene graph may comprise dependencies which would make it more difficult to modify an updating frequency of only part of a scene graph.

Figure 2:
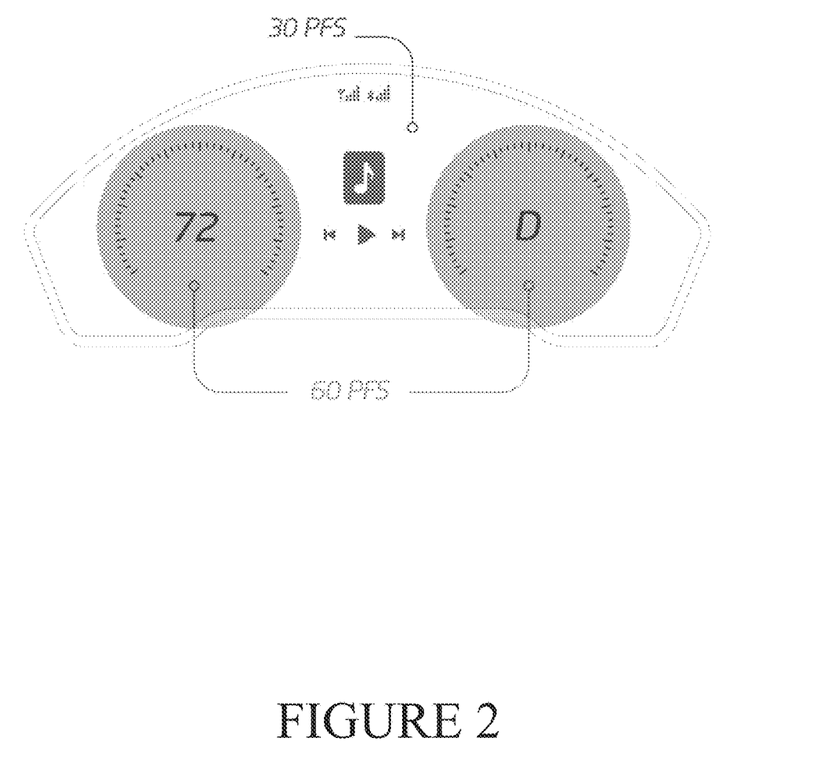
FIG. 2 illustrates an example use case in accordance with at least some embodiments of the present invention.

FIG. 2 illustrates an example use case in accordance with at least some embodiments of the present invention. FIG. 2 is an example view of display 120 of FIG. 1. In FIG. 2 are identified two subsections, a speedometer subsection on the left, which is indicated as having a frame rate of 60 frames per second, and a media playback subsection in the center part of the figure, having a frame rate of 30 frames per second, FPS. The indicated frame rates may be default frame rates of the respective subsections, for example, defined in subsection definitions.

Figure 3:
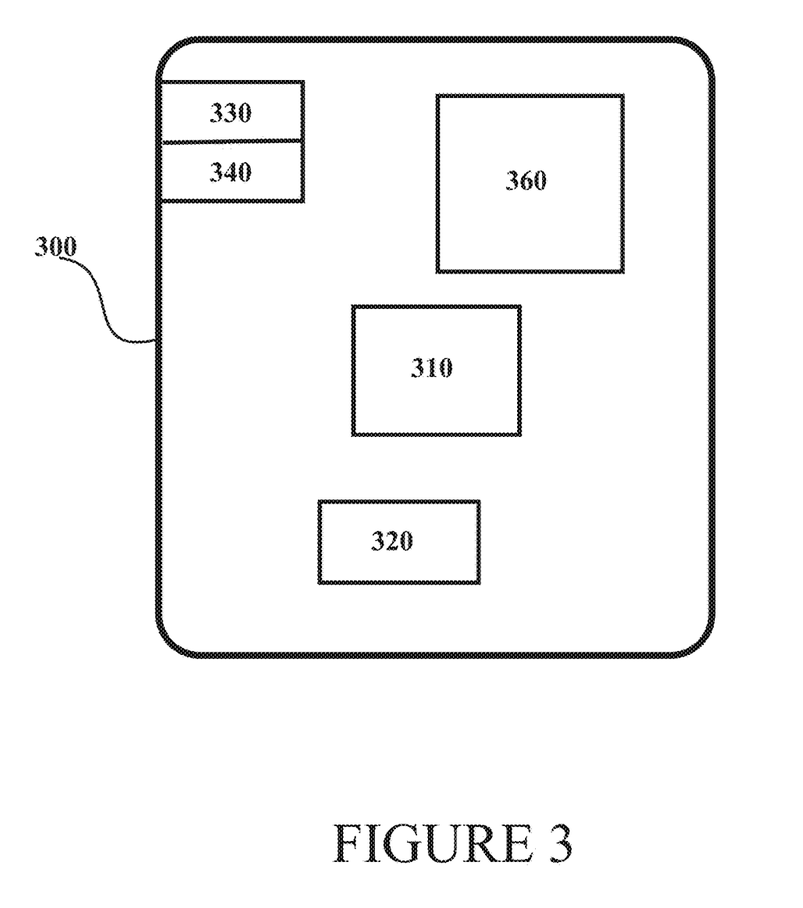
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Brisbane processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one standard. Transmitter 330 may comprise more than one transmitter. Receiver 340 may comprise more than one receiver. Transmitter 330 and/or receiver 340 may be configured to operate in accordance with Ethernet, parallel bus and/or serial bus standards, for example.

Device 300 may comprise user interface, UI, 360. UI 360 may comprise at least one of a display, a keyboard, a touchscreen, a physical controller, an external physical controller, an interface for an external physical controller, a vibrator arranged to signal to a user by causing device 300 to vibrate, a speaker and a microphone. A user may be able to operate device 300 via UI 360, for example to configure device 300 or interact with further devices via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300.

Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
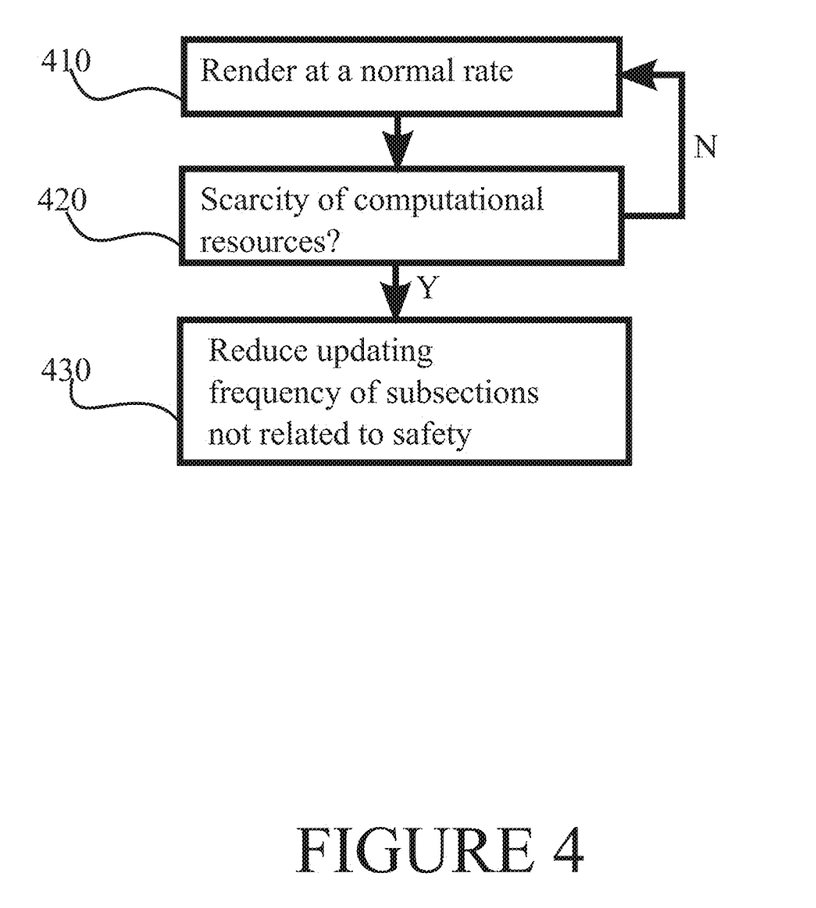
FIG. 4 is a first flow chart of a first method in accordance with at least some embodiments of the present invention.

FIG. 4 is a first flow chart of a first method in accordance with at least some embodiments of the present invention. The phases of the illustrated method may be performed in device 110, for example, or in a control device configured to control the functioning of device 110, when implanted therein.

Phase 410 comprises rendering a graphical output at a normal rate. What is meant by normal rate is described above. In phase 420 it is determined, if a scarcity of computational resources is in effect. As described above, such a scarcity may be due to processing load from other tasks, or an overheat situation, for example. In case no scarcity is detected, processing returns to phase 410. In case a scarcity is determined to exist, processing advances to phase 430. The check of phase 420 may be performed periodically, for example every 10 milliseconds, or the check of phase 420 may be triggered by a processing load of a processor or processing core reaching a predetermined threshold, such as for example 95% of maximum capacity. In phase 430, the system reacts to the determined scarcity by lowering an updating frequency of at least one subsection that is not related to safety. Whether subsections are related to safety may be determined by consulting subsection definitions, for example.

Figure 5:
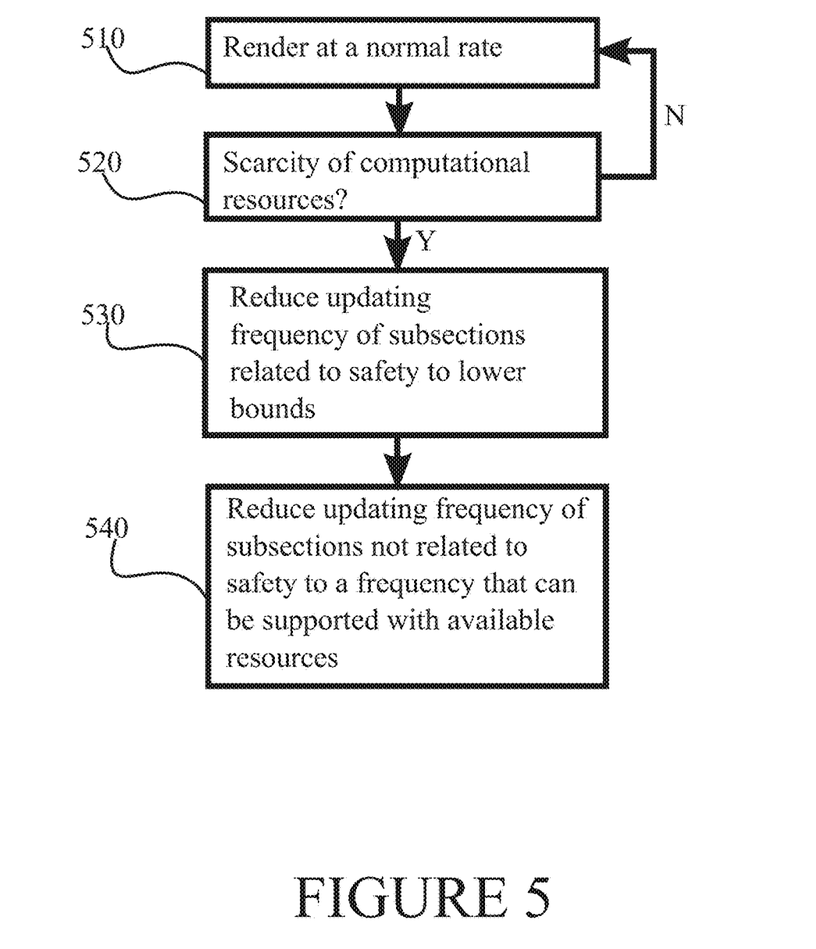
FIG. 5 is a second flow chart of a second method in accordance with at least some embodiments of the present invention.

FIG. 5 is a second flow chart of a second method in accordance with at least some embodiments of the present invention. The phases of the illustrated method may be performed in device 110, for example, or in a control device configured to control the functioning of device 110, when implanted therein.

Phases 510 and 520 correspond essentially to phases 410 and 420, respectively, of FIG. 4. Phase 530 comprises reducing an updating frequency of subsections relating to safety to a lower bound. Whether subsections are related to safety and what their lower bounds are may be determined by consulting subsection definitions, for example. The lower bound may represent an updating frequency that is lower than a default updating frequency, but which still provides an acceptable level of performance.

Phase 540 comprises using computational resources that remain after setting the subsections relating to safety to their lower bounds to set updating frequencies of subsections not related to safety to levels that can be run. These frequencies may be substantially lower than the default updating frequencies of these subsections.

Figure 6:
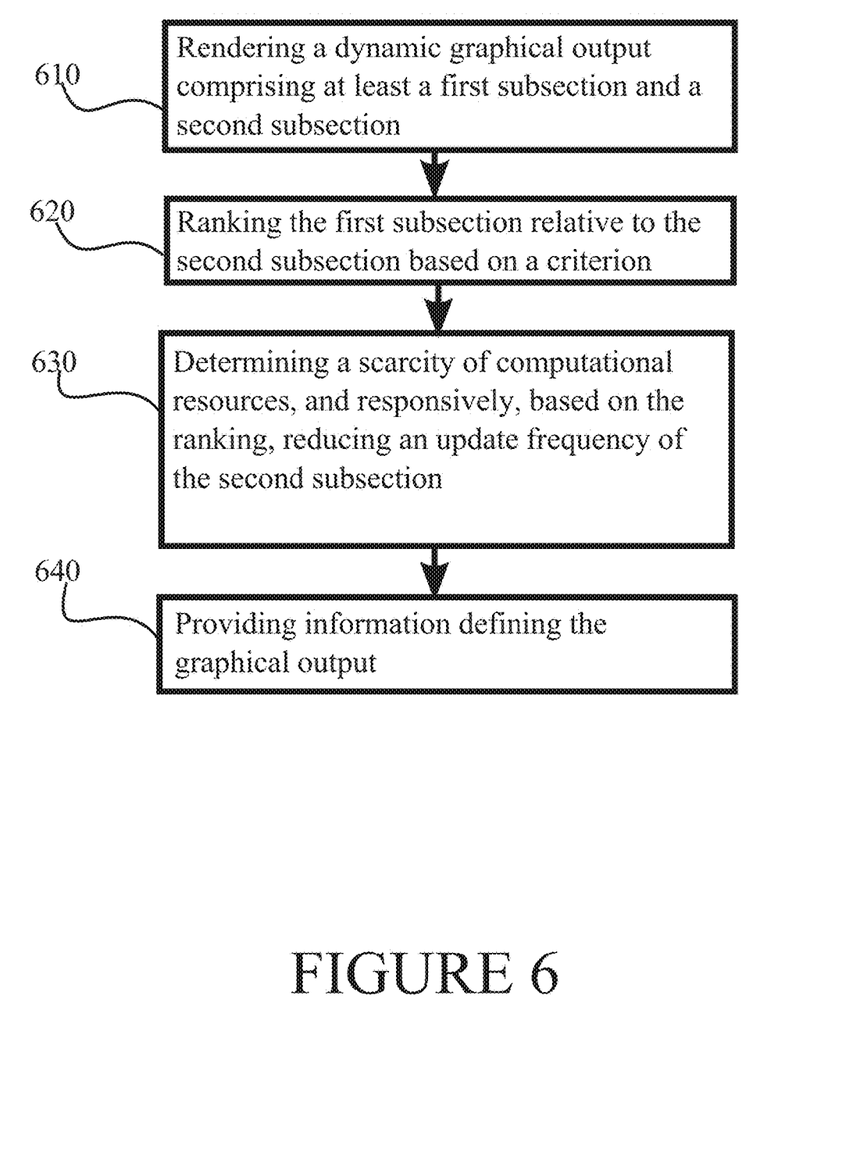
FIG. 6 is a third flow chart of a third method in accordance with at least some embodiments of the present invention.

FIG. 6 is a third flow chart of a third method in accordance with at least some embodiments of the present invention. The phases of the illustrated method may be performed in device 110, for example, or in a control device configured to control the functioning of device 110, when implanted therein.

Phase 610 comprises rendering a dynamic graphical output, the graphical output comprising at least a first subsection and a second subsection. Phase 620 comprises ranking the first subsection relative to the second subsection based on a criterion. Phase 630 comprises determining a scarcity of computational resources, and responsively, based on the ranking, causing the first subsection to be rendered at a higher update frequency than the second subsection. Finally, phase 640 comprises providing information defining the graphical output.

In general there is provided an apparatus comprising at least one processing core configured to render a dynamic graphical output, the graphical output comprising at least a first subsection and a second subsection, rank the first subsection relative to the second subsection based on at least one criterion, determine a scarcity of computational resources, and responsively, based on the ranking, reduce an update frequency of the second subsection, and a transmitter configured to provide information defining the graphical output toward a display. The scarcity may be determined based on a periodic check and/or the scarcity may be determined responsive to a processing load in a processor or processing core exceeding a predefined level. Dynamic graphical output may comprise a graphical output modified in real time responsive to information received from an information source. The graphical output may comprise an animated instrument panel, for example, such as an animated instrument panel of a vehicle. An animated instrument panel may comprise at least one, and in some embodiments at least two, animated instrument displays.

In some embodiments, the criterion is relevance to safety. For example, relevance to safety of an industrial process, car or aircraft. Safety may refer to safety of persons or the environment, for example. In other embodiments, the criterion is characteristic timescales of the first and second subsections. In yet further embodiments, the criterion is a pre-configured priority.

In some embodiments, the graphical output comprises information concerning a current state of at least one of: an automobile system, an aircraft system, an industrial machine and a power generation plant. An automobile system may comprise an engine or fuel tank sensor, for example. An aircraft system may comprise an altimeter or engine, for example. An industrial machine may comprise a chemical reactor or pellet machine, for example. A power generation plant may comprise a nuclear power plant, for example. In some embodiments, the graphical output comprises information concerning at least one of: a communication session, a media playback session, a broadcast session and a user session.

In some embodiments, the same processor or processing core is configured to both render the graphical output and to rank the subsections. In other embodiments, a first processor or processing core is configured to render the graphical output and a second processor or processing core is configured to rank the subsections.

In some embodiments, the determining of the scarcity of computational resources is based on at least one of a thermal limit and an overload condition. Scarcity may alternatively, or additionally, occur as a result of interrupts. For example, the standard ISO 26262, Road Vehicles Functional Safety defines interrupt conditions. Determining scarcity may thus comprise, for example, that more than a predetermined number of interrupts occurs during a predetermined time, or that a frequency of interrupts exceeds a predetermined limit. Either way may be characterized as determining scarcity based on a quantity of interrupts. The scarcity may be determined periodically and/or as a load state of a processor or processing core exceeding a predetermined load level. The scarcity may be determined based on a lag associated with a previous frame. In some embodiments, a scarcity of computational resources may be predicted based on changes in data relating to producing the graphical output.

In some embodiments, the at least one processing core is further configured to adjust, in real time, the ranking of the first subsection relative to the second subsection based at least in part on an operating condition. For example, what is relevant to safety may change as a response to circumstances. For example, a light amplifying display may become relevant to safety when the sun sets and night begins. For example, a collision avoidance radar display subsection may become relevant to safety when a user activates a reverse gear. If scarcity exists when the ranking is adjusted, the adjustment in ranking may trigger modification of at least one updating frequency of at least one subsection.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
at least one processing core configured to:
render a dynamic graphical output, the graphical output comprising at least a first subsection and a second subsection;
rank the first subsection relative to the second subsection based on at least one criterion;
determine a scarcity of computational resources available for rendering, and responsively, based on the ranking, reduce an update frequency of the second subsection, wherein the at least one processing core is configured to determine the scarcity of computational resources based on at least one of a thermal limit, a determined lag and a quantity of interrupts, and
a transmitter configured to provide information defining the graphical output toward a display, wherein the graphical output comprises information concerning a current state of at least one of: an automobile system, an aircraft system, an industrial machine and a power generation plant.

2. The apparatus according to claim 1, wherein the criterion is relevance to safety.

3. The apparatus according to claim 1, wherein the graphical output comprises information concerning at least one of: a communication session, a media playback session, a broadcast session, a user session, map information, a battery level, a velocity indication, an altitude indication and an industrial process indication.

4. The apparatus according to claim 1, wherein the criterion is at least one of a characteristic timescale and a priority.

5. The apparatus according to claim 4, wherein the first subsection has a shorter characteristic timescale than the second subsection.

6. The apparatus according to claim 5, wherein the first subsection comprises a digital instrument display and the second subsection indicates at least one of: remaining fuel, remaining distance to maintenance and oil pressure.

7. The apparatus of claim 6, wherein the digital instrument display indicates at least one of: velocity of a car, velocity of an aircraft and engine revolutions per time unit.

8. The apparatus according to claim 1, wherein causing the first subsection to be rendered at a higher update frequency than the second subsection comprises keeping an update frequency of the first subsection constant and lowering an update frequency of the second subsection.

9. The apparatus according to claim 1, wherein the apparatus is configured to set an update frequency of the first subsection to a predefined minimum update frequency, and subsequently select the reduced update frequency for the second subsection based on computational resources then remaining.

10. The apparatus according to claim 1, wherein the at least one processing core is further configured to adjust, in real time, the ranking of the first subsection relative to the second subsection based at least in part on an operating condition.

11. The apparatus according to claim 1, wherein responsive to the scarcity, the apparatus is configured to begin rendering at least one of the first subsections and the second subsection in at least one of a smaller size, a reduced detail level and a reduced quality level than before the scarcity.

12. A method comprising:
rendering a dynamic graphical output, the graphical output comprising at least a first subsection and a second subsection;
ranking the first subsection relative to the second subsection based on at least one criterion;
determining a scarcity of computational resources available for rendering, and responsively, based on the ranking, reducing an update frequency of the second subsection, wherein the scarcity of computational resources is determined based on at least one of a thermal limit, a determined lag and a quantity of interrupts, and
providing information defining the graphical output, wherein the graphical output comprises information concerning a current state of at least one of: an automobile system, an aircraft system, an industrial machine and a power generation plant.

13. The method according to claim 12, wherein the criterion is relevance to safety.

14. The method according to claim 12, wherein the graphical output comprises information concerning at least one of: a communication session, a media playback session, a broadcast session, a user session, map information, a battery level, a velocity indication, an altitude indication and an industrial process indication.

15. The method according to claim 12, wherein the criterion is at least one of characteristic timescale and a priority.

16. The apparatus according to claim 15, wherein the first subsection has a shorter characteristic timescale than the second subsection.

17. The method according to claim 16, wherein the first subsection comprises a digital instrument display and the second subsection indicates at least one of: remaining fuel, remaining distance to maintenance and oil pressure.

18. The method of claim 17, wherein the digital instrument display indicates at least one of: velocity of a car, velocity of an aircraft and engine revolutions per time unit.

19. The method according to claim 12, further comprising adjusting, in real time, the ranking of the first subsection relative to the second subsection based at least in part on an operating condition.

20. A non-transitory computer readable medium having stored thereon a set of computer readable instructions that, when executed by at least one processor, cause an apparatus to at least:
render a dynamic graphical output, the graphical output comprising at least a first subsection and a second subsection,
rank the first subsection relative to the second subsection based on at least one criterion,
determine a scarcity of computational resources available for rendering, and responsively, based on the ranking, reduce an update frequency of the second subsection, and provide information defining the graphical output, wherein the scarcity of computational resources is determined based on at least one of a thermal limit, a determined lag and a quantity of interrupts, and
provide information defining the graphical output, wherein the graphical output comprises information concerning a current state of at least one of: an automobile system, an aircraft system, an industrial machine and a power generation plant.

* * * * *